United States Patent [19]

Burns et al.

[11] Patent Number: 6,035,390

[45] Date of Patent: Mar. 7, 2000

[54] METHOD AND APPARATUS FOR GENERATING AND LOGICALLY COMBINING LESS THAN (LT), GREATER THAN (GT), AND EQUAL TO (EQ) CONDITION CODE BITS CONCURRENTLY WITH THE EXECUTION OF AN ARITHMETIC OR LOGICAL OPERATION

[75] Inventors: Jeffrey L. Burns; Sang Hoo Dhong, both of Austin; Kevin John Nowka, Round Rock, all of Tex.; Joel Abraham Silberman, Somers, N.Y.

[73] Assignee: International Business Machines Corporation, Armonk, N.Y.

[21] Appl. No.: 09/005,471

[22] Filed: Jan. 12, 1998

[51] Int. Cl.[7] ........................................................ G06F 9/30
[52] U.S. Cl. ........................... 712/220; 712/226; 712/209; 712/200
[58] Field of Search ........................... 712/700, 222, 712/226, 209, 200, 220; 395/800.23, 800.41, 376, 562, 381; 364/500; 714/35; 706/8; 700/3

[56] References Cited

U.S. PATENT DOCUMENTS

| | | | |
|---|---|---|---|
| 4,346,437 | 8/1982 | Blahut et al. | 395/381 |
| 4,589,065 | 5/1986 | Auslander et al. | 714/35 |
| 4,618,956 | 10/1986 | Horst | 371/68 |
| 4,845,659 | 7/1989 | Hrusecky | 712/222 |
| 4,924,422 | 5/1990 | Vassiliadis et al. | 708/210 |
| 4,947,359 | 8/1990 | Vassiliadis et al. | 708/210 |
| 4,951,195 | 8/1990 | Fogg, Jr. et al. | 364/500 |
| 5,045,992 | 9/1991 | Yates, Jr. et al. | 394/562 |
| 5,201,056 | 4/1993 | Daniel et al. | 395/800.41 |
| 5,287,467 | 2/1994 | Blaner et al. | 395/582 |
| 5,511,172 | 4/1996 | Kimura et al. | 395/582 |
| 5,588,127 | 12/1996 | Bosshart | 395/376 |
| 5,787,407 | 7/1998 | Viot | 706/8 |
| 5,860,017 | 1/1999 | Sharangpani et al. | 395/800.23 |

OTHER PUBLICATIONS

Kavousianos and Nikolos, "Self–Exercising Self Testing K–order Comparators", VLSI Test Symposium, 1997, IEEE, p. 216–221, Apr. 1997.

Nasir, "DSP Chips and Total Processing Load of FFT Analysis", IEEE Colloquium on DSP Chips in Real–Time Instrumentation and Display Systems, Digest No: 1997/300, p. 6/1–6/5, Sep. 1997.

H. Sachar, "Fast Resolution of Condition Code For Some Logical Operations," IBM Technical Disclosure Bulletin, vol. 23, No. 4, Sep. 1980, pp. 1725–1726.

Primary Examiner—Meng-Ai T. An
Assistant Examiner—John Ciccozzi
Attorney, Agent, or Firm—Casimer K. Salys; Brian F. Russell; Andrew J. Dillon

[57] ABSTRACT

A processor includes at least an execution unit that executes an instruction by performing an operation indicated by the instruction utilizing one or more operands and condition code logic that determines less than, greater than, and equal to condition code bits associated with the instruction concurrently with execution of the instruction by the execution unit. In one embodiment, the condition code logic includes a single computation stage that receives as inputs individual bit values of bit positions within first and second operands and logically combines the individual bit values. The single computation stage outputs, for each bit position, propagate, generate, and kill signals that collectively indicate values for the less than, greater than, and equal to condition code bits. One or more merging stages coupled to the computation stage then merge the propagate, generate, and kill signals into output signals that set the condition code bits.

16 Claims, 3 Drawing Sheets

METHOD AND APPARATUS FOR GENERATING AND LOGICALLY COMBINING LESS THAN (LT), GREATER THAN (GT), AND EQUAL TO (EQ) CONDITION CODE BITS CONCURRENTLY WITH THE EXECUTION OF AN ARITHMETIC OR LOGICAL OPERATION

BACKGROUND OF THE INVENTION

1. Technical Field

The present invention relates in general to a method and system for data processing and, in particular, to a method and apparatus for computing condition code bits. Still more particularly, the present invention relates to a method and apparatus for computing less than (LT), greater than (GT), and equal to (EQ) condition code bits concurrent with the execution of an instruction.

2. Description of the Related Art

A state-of-the-art superscalar processor can be comprised of, for example, an instruction cache for storing instructions, an instruction buffer for temporarily storing instructions fetched from the instruction cache for execution, one or more execution units for executing sequential instructions, a branch processing unit (BPU) for executing branch instructions, a dispatch unit for dispatching sequential instructions from the instruction buffer to particular execution units, and a completion buffer for temporarily storing sequential instructions that have finished execution, but have not completed.

Branch instructions executed by the branch processing unit (BPU) of the superscalar processor can be classified as either conditional or unconditional branch instructions. Unconditional branch instructions are branch instructions that change the flow of program execution from a sequential execution path to a specified target execution path and that do not depend upon a condition supplied by the occurrence of an event. Thus, the branch specified by an unconditional branch instruction is always taken. In contrast, conditional branch instructions are branch instructions for which the indicated branch in program flow may be taken or not taken depending upon a condition within the processor, for example, the state of specified condition register bits or the value of a counter. Conditional branch instructions can be further classified as either resolved or unresolved, based upon whether or not the condition upon which the branch depends is available when the conditional branch instruction is evaluated by the branch processing unit (BPU). Because the condition upon which a resolved conditional branch instruction depends is known prior to execution, resolved conditional branch instructions can typically be executed and instructions within the target execution path fetched with little or no delay in the execution of sequential instructions. Thus, it is advantageous to determine condition register bits or another condition upon which a conditional branch instruction may depend as quickly as possible so that the conditional branch instruction can be resolved prior to execution. Even if a conditional branch instruction is not resolved prior to its execution, meaning that the conditional branch is speculatively predicted, it is still advantageous to compute the condition upon which the branch instruction depends as quickly as possible because the performance penalty incurred in the event of misprediction is thereby minimized.

Condition register bits upon which conditional branch instructions may depend are set in response to predetermined architecturally defined instructions, for example, compare instructions and certain "recording" forms of add, subtract, and other arithmetic and logical instructions. The condition register bits set by compare instructions and recording instructions include a less than (LT) bit, a greater than (GT) bit, and an equal to (EQ) bit, which indicate whether the result of a particular instruction is less than, greater than, or equal to zero, respectively. Conventional processors first determine the result of an instruction (e.g., add) and then compare the result with zero in subsequent cycle(s) to produce the condition register bits. As will be appreciated, this serial architecture places an inherent limitation upon how early the condition register bits can be determined. More recently, various techniques have been employed in order to determine the value of the EQ bit in parallel with the execution of certain types of instructions. Although the early determination of the value of the EQ bit provides some performance advantages over the prior serial approach, there remains a need in the art for a method and apparatus for computing the value of all of the LT, GT, and EQ bits concurrent with arithmetic and logical operations in order to enhance branch processing performance.

SUMMARY OF THE INVENTION

It is therefore one object of the present invention to provide an improved method and system for data processing.

It is another object of the present invention to provide an improved method and apparatus for computing condition code bits.

It is yet another object of the present invention to provide a method and apparatus for computing less than (LT), greater than (GT), and equal to (EQ) condition code bits concurrent with the execution of an instruction.

The foregoing objects are achieved as is now described. A processor includes at least an execution unit that executes an instruction by performing an operation indicated by the instruction utilizing one or more operands and condition code logic that determines less than, greater than, and equal to condition code bits associated with the instruction concurrently with execution of the instruction by the execution unit. In one embodiment, the condition code logic includes a single computation stage that receives as inputs individual bit values of bit positions within first and second operands and logically combines the individual bit values. The single computation stage outputs, for each bit position, propagate, generate, and kill signals that collectively indicate values for the less than, greater than, and equal to condition code bits. One or more merging stages coupled to the computation stage then merge the propagate, generate, and kill signals into output signals that set the condition code bits.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
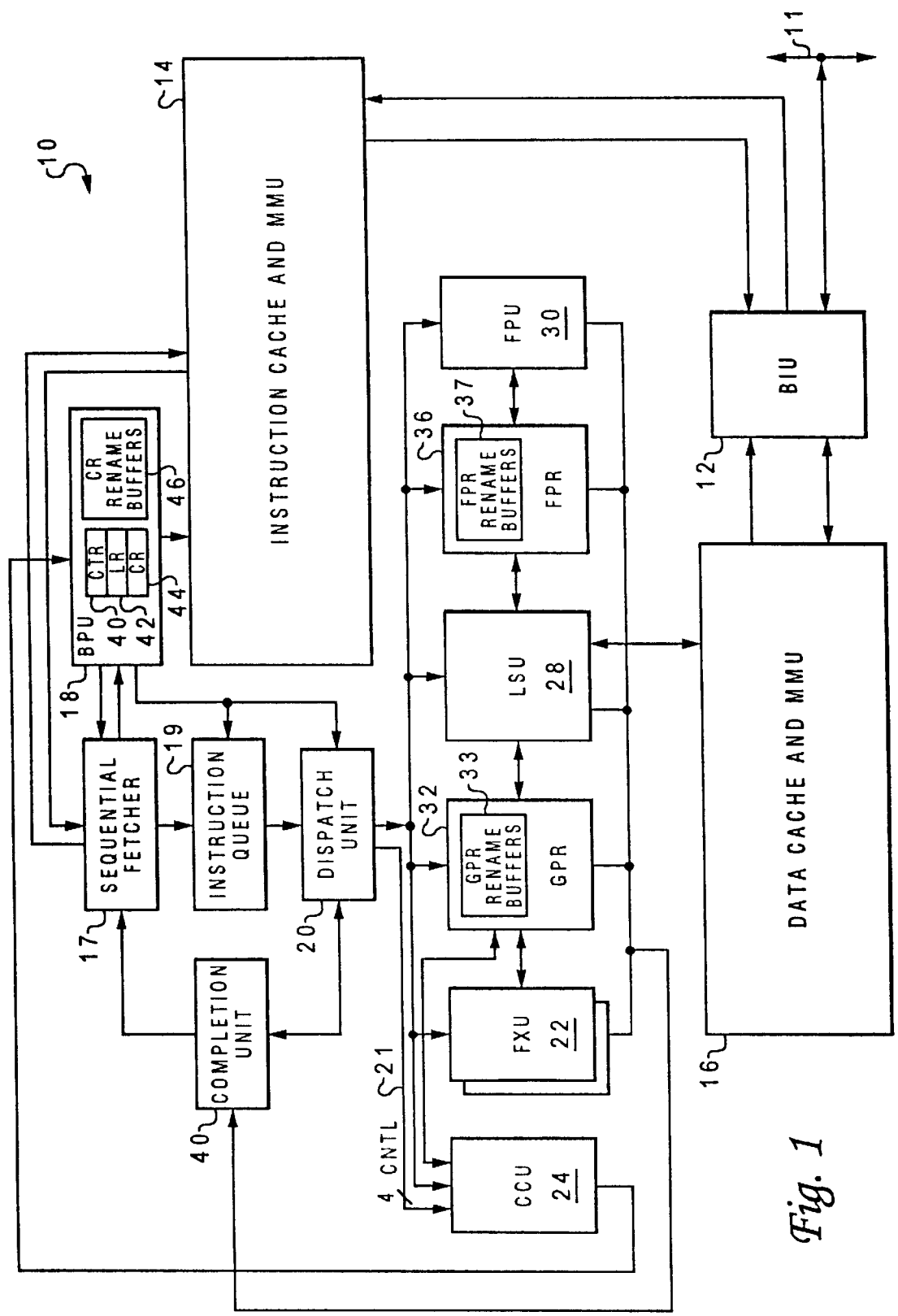
FIG. 1 depicts an illustrative embodiment of a data processing system with which the method and system of the present invention may advantageously be utilized.

With reference now to the figures and in particular with reference to FIG. 1, there is depicted a block diagram of an illustrative embodiment of a processor, indicated generally at 10, for processing information in accordance with the invention recited within the appended claims. In the depicted illustrative embodiment, processor 10 comprises a single integrated circuit superscalar microprocessor. Accordingly, as discussed further below, processor 10 includes various execution units, registers, buffers, memories, and other functional units, which are all formed by integrated circuitry. Processor 10 preferably comprises one of the PowerPC™ line of microprocessors available from IBM Microelectronics such as the PowerPC™ 604, which is described in detail in PowerPC™ 604 RISC Microprocessor User's Manual (available from IBM Microelectronics as Order No. MPR604UMU-01 and incorporated herein by reference); however, those skilled in the art will appreciate from the following description that the present invention can advantageously be implemented within other suitable processors, particularly those which utilize condition code bits to resolve conditional branch instructions.

As illustrated in FIG. 1, processor 10 is coupled to bus 11 via a bus interface unit (BIU) 12 within processor 10. BIU 12 controls the transfer of information between processor 10 and other devices coupled to bus 11, such as a main memory (not illustrated), which together with processor 10 and bus 11 form a fully functional data processing system. BIU 12 is also connected to instruction cache 14 and data cache 16 within processor 10. High-speed caches, such as instruction cache 14 and data cache 16, enable processor 10 to achieve relatively fast access times to a subset of data or instructions previously transferred from main memory to caches 14 and 16, thus improving the overall performance of the data processing system. Instruction cache 14 is further connected to sequential fetcher 17, which fetches up to a cache line of instructions from instruction cache 14 during each cycle and transmits the fetched instructions to both branch processing unit (BPU) 18 and instruction queue 19. Branch instructions are retained by BPU 18 for execution and are cancelled from instruction queue 19; sequential instructions, on the other hand, are cancelled from BPU 18 and buffered within instruction queue 19 for subsequent execution by sequential instruction execution circuitry within processor 10.

BPU 18 includes count register (CTR) 40, link register (LR) 42, and condition register (CR) 44, the value of which may be utilized to resolve conditional branch instructions. BPU 18 further includes CR rename buffers 46, which temporarily store renamed copies of CR 44 generated by the execution of compare instructions or generated in parallel with the execution of certain recording instructions. In a preferred embodiment, CR 44 (and each of CR rename buffers 46) contains a number of distinct fields that each comprise one or more bits. Among these fields is a condition code field containing LT, GT, and EQ bits, which respectively indicate if a value (typically the result of an instruction) is less than zero, greater than zero, or equal to zero. Conditional branch instructions that cannot be resolved prior to execution by reference to CR 44, LR 42 or CTR 40 are preferably predicted utilizing conventional branch processing circuitry within BPU 18 such as a branch history table (BHT) or branch target address cache (BTAC).

In the depicted illustrative embodiment, in addition to BPU 18, the execution circuitry of processor 10 comprises multiple execution units for sequential instructions, including one or more fixed-point units (FXUs) 22, a load-store unit (LSU) 28, and a floating-point unit (FPU) 30. As is well-known to those skilled in the computer arts, each of execution units 22, 28, and 30 typically executes one or more instructions of a particular type of sequential instructions during each processor cycle. For example, FXU(s) 22 perform fixed-point mathematical and logical operations such as addition, subtraction, ANDing, ORing, and XORing, utilizing source operands received from specified general purpose registers (GPRs) 32 or GPR rename buffers 33. Following the execution of a fixed-point instruction, FXU 22 outputs the data results of the instruction to GPR rename buffers 33, which provide temporary storage for the result data until the result data is written from GPR rename buffers 33 to one or more of GPRs 32. FPU 30 typically performs single and double-precision floating-point arithmetic and logical operations, such as floating-point multiplication and division, on source operands received from floating-point registers (FPRs) 36 or FPR rename buffers 37. FPU 30 outputs data resulting from the execution of floating-point instructions to selected FPR rename buffers 37, which temporarily store the result data until the result data is written from FPR rename buffers 37 to selected FPRs 36. As its name implies, LSU 28 typically executes floating-point and fixed-point instructions which either load data from memory (i.e., either data cache 16 or main memory) into selected GPRs 32 or FPRs 36 or which store data from a selected one of GPRs 32, GPR rename buffers 33, FPRs 36, or FPR rename buffers 37 to memory.

In addition to execution units 22, 28, and 30, the execution circuitry of processor 10 includes condition code unit (CCU) 24, which directly executes signed and unsigned compare instructions and computes condition code bits for recording instructions processed by other execution units. As illustrated, CCU 24 receives four control signals 21 from dispatch unit 20 that indicate the instruction type of each compare and recording instruction dispatched. CCU 24 also receives from GPRs 32 and/or GPR rename buffers 33 (and possibly other sources) the operands specified by each compare and recording instruction. Compare and recording instructions in the PowerPC™ instruction set architecture for which CCU 24 computes condition code bits are summarized below in Table I.

TABLE I

| Instr. | Def. | A Input | B Input | CA Input | Control |
|---|---|---|---|---|---|
| add. | D = A + B | A | B | 0 | ADD |
| adde. | D = A + B + CA | A | B | CA | ADD |
| addme. | D = A + CA − 1 | A | −1 | CA | ADD |
| addze. | D = A + CA | A | 0 | CA | ADD |
| subf. | D = !A + B + 1 | !A | B | 1 | SUB |
| subfc. | D = !A + B + 1 | !A | B | 1 | SUB |
| subfe. | D = !A + B + CA | !A | B | CA | SUB |
| subfme. | D = !A + CA − 1 | !A | −1 | CA | SUB |
| subfze. | D = !A + CA | !A | 0 | CA | SUB |
| cmp | | !A | B | 1 | S_CMP |
| cmpi | | !A | B | 1 | S_CMP |
| cmpl | | !A | B | 1 | US_CMP |
| cmpli | | !A | B | 1 | US_CMP |

In Table I, the period (".") following an instruction mnemonic designates that mnemonic as a recording form of an instruction that would not otherwise set the condition code bits; an exclamation point ("!") preceding an operand name indicates the one's complement of the operand; CA is an architecturally defined carry-in bit; and the control signals ADD, SUB, S_CMP, and US_CMP indicate add, subtract, signed compare, and unsigned compare instructions, respectively. In accordance with the present invention, CCU 24 directly executes compare instructions to obtain the resulting LT, GT, and EQ condition code bits in a single cycle. CCU 24 also computes, in a single cycle, the LT, GT, and EQ condition code bits for recording instructions in parallel with the execution of the recording instructions by FXUs 22. In this manner, the conditions upon which conditional branch instructions depend are computed as early as possible, resulting in less speculation and quicker recovery from branch misprediction.

Processor 10 employs both pipelining and out-of-order execution of instructions to further improve the performance of its superscalar architecture. Accordingly, instructions can be executed opportunistically by FXU 22, CCU 24, LSU 28, and FPU 30 in any order as long as data dependencies and antidependencies are observed. In addition, as is typical of many high-performance processors, each instruction is processed at a number of pipeline stages, including fetch, decode/dispatch, execute, finish, and completion/writeback.

During the fetch stage, sequential fetcher 17 retrieves up to a cache line of instructions from instruction cache 14. As noted above, sequential instructions fetched from instruction cache 14 are buffered within instruction queue 19, while branch instructions are removed (folded out) from the sequential instruction stream. Branch instructions are processed at each of the remaining pipeline stages by circuitry within BPU 18.

During the decode/dispatch stage, dispatch unit 20 decodes and dispatches one or more sequential instructions from instruction queue 19 to execution units 22, 24, 28, and 30. During the decode/dispatch stage, dispatch unit 20 also allocates a rename buffer within GPR rename buffers 33 or FPR rename buffers 37 for each dispatched instruction's result data, if necessary. In the depicted illustrative embodiment, instructions dispatched by dispatch unit 20 are also passed to a completion buffer within completion unit 40. Processor 10 tracks the program order of the dispatched instructions during out-of-order execution utilizing unique instruction identifiers associated with the instructions in the completion buffer of completion unit 40.

During the execute stage, execution units 22, 24, 28, and 30 execute sequential instructions received from dispatch unit 20 opportunistically as operands and execution resources for the indicated operations become available. Each of execution units 22, 24, 28, and 30 are preferably equipped with a reservation station that stores instructions dispatched to that execution unit until operands or execution resources become available. After execution of an instruction has terminated, execution units 22, 28, and 30 store data results of the instruction within either GPR rename buffers 33 or FPR rename buffers 37, depending upon the instruction type. CCU 24, on the other hand, stores the condition code bits it generates within the condition code field of one of CR rename buffers 46.

Next, execution units 22, 24, 28, and 30 notify completion unit 40 which instructions stored within the completion buffer of completion unit 40 have finished execution. Instructions are then completed by completion unit 40 in program order by marking the instructions as complete in the completion buffer. Thereafter, during the writeback stage, which is preferably merged with the completion stage, the results of the instructions are transferred from a CR rename buffer 46 to CR 44 and from GPR rename buffers 33 and FPR rename buffers 37 to GPRs 32 and FPRs 36, respectively.

Figure 2:
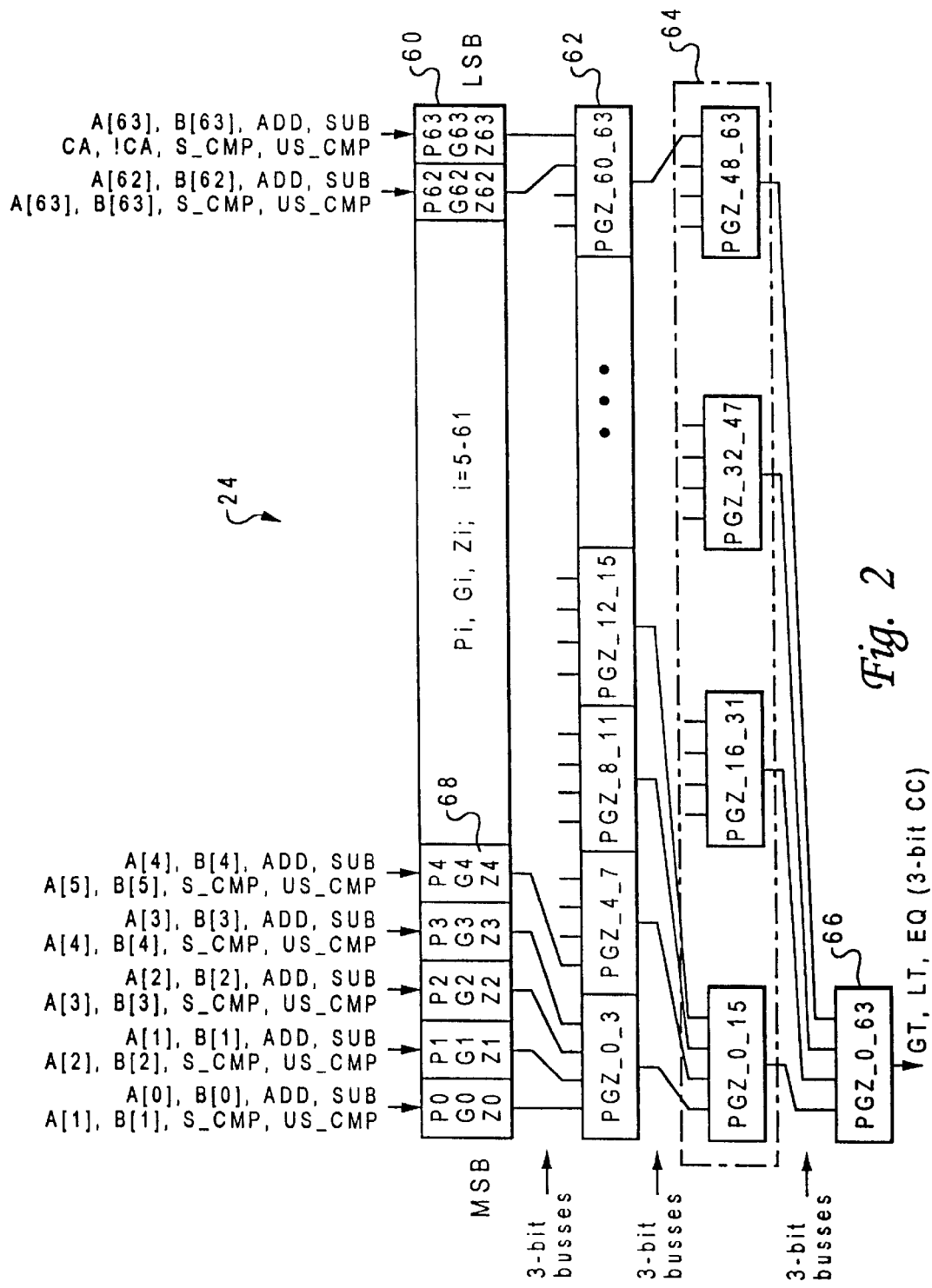
FIG. 2 is a block diagram of the condition code unit (CCU) of the processor depicted in FIG. 1.

Referring now to FIG. 2, there is depicted a more detailed block diagram of CCU 24. As illustrated, CCU 24 includes a single computation stage 60 and three merging stages 62, 64, and 66. Computation stage 60 includes one combination element 68 for each operand bit position (e.g., 64 in the illustrated embodiment). The combination elements 68 for bit positions 0–62 each receive as inputs the bits of the corresponding and next less significant bit positions of operands A and B, as well as the four control signals 21 generated by dispatch unit 20. The combination element 68 for bit position 63 receives as inputs bit 63 of operands A and B, control signals 21, and the CA bit and its complement. Importantly, the CA bit is not a carry such as may be generated by the execution of an add instruction, but is instead a bit within an architecturally defined register. From these inputs, computation stage 60 computes propagate (P), generate (G), and kill (Z) outputs for each of bit positions 0–63 utilizing the following equations:

Propagate, generate, and kill outputs, bit 0 (MSB):

$$P[0] = (((! A[0] \text{ or } !B[0]) \text{ and } ((A[0] \text{ xor } !B[0]) \text{ xor }$$
$$(A[0+1] \text{ or } B[0+1]))) \text{ and ADD}) \text{ or }$$
$$(((A[0] \text{ or } !B[0]) \text{ and } ((A[0] \text{ xor } B[0]) \text{ xor }$$
$$(! A[0+1] \text{ or } B[0+1]))) \text{ and SUB}) \text{ or }$$
$$(((A[0] \text{ or } !B[0]) \text{ and } ((A[0] \text{ xor } B[0]) \text{ xor }$$
$$(! A[0+1] \text{ or } B[0+1]))) \text{ and S\_CMP}) \text{ or }$$
$$(((! A[0] \text{ or } B[0]) \text{ and } ((A[0] \text{ xor } B[0] \text{ xor }$$
$$(! A[0+1] \text{ or } B[0+1]))) \text{ and US\_CMP})$$

$$G[0] = (((! A[0] \text{ or } !B[0]) \text{ and } ((A[0] \text{ xor } !B[0]) \text{ and }$$
$$(A[0+1] \text{ or } B[0+1]))) \text{ and ADD}) \text{ or }$$
$$(((A[0] \text{ or } !B[0]) \text{ and } ((A[0] \text{ xor } B[0]) \text{ and }$$
$$(! A[0+1] \text{ or } B[0+1]))) \text{ and SUB}) \text{ or }$$
$$(((A[0] \text{ or } !B[0] \text{ and } ((A[0] \text{ xor } B[0]) \text{ and }$$
$$(! A[0+1] \text{ or } B[0+1]))) \text{ and S\_CMP}) \text{ or }$$
$$(((! A[0] \text{ or } B[0]) \text{ and } ((A[0] \text{ xor } B[0] \text{ and }$$
$$(! A[0+1] \text{ or } B[0+1]))) \text{ and US\_CMP})$$

$$Z[0] = (((A[0] \text{ and } B[0]) \text{ or } ((A[0] \text{ xor } B[0]) \text{ and }$$
$$(! A[0+1] \text{ and } !B[0+1]))) \text{ and ADD}) \text{ or }$$
$$(((! A[0] \text{ and } B[0]) \text{ or } ((! A[0] \text{ xor } B[0]) \text{ and }$$
$$(A[0+1] \text{ and } !B[0+1]))) \text{ and SUB}) \text{ or }$$
$$(((! A[0] \text{ and } B[0]) \text{ or } ((! A[0] \text{ xor } B[0]) \text{ and }$$
$$(A[0+1] \text{ and } !B[0+1]))) \text{ and S\_CMP}) \text{ or }$$
$$(((A[0] \text{ and } !B[0]) \text{ or } ((! A[0] \text{ xor } B[0]) \text{ and }$$
$$(A[0+1] \text{ and } !B[0+1]))) \text{ and US\_CMP})$$

Propagate, generate, and kill outputs, bits 1–62:

$P[i] =$ $(((A[i] \text{ xor } !B[i]) \text{ xor } (A[i+1] \text{ or } B[i+1])) \text{ and ADD})$ or $(((A[i] \text{ xor } B[i]) \text{ xor } (! A[i+1] \text{ or } B[i+1])) \text{ and SUB})$ or $(((A[i] \text{ xor } B[i]) \text{ xor } (! A[i+1] \text{ or } B[i+1])) \text{ and S\_CMP})$ or $(((A[i] \text{ xor } B[i]) \text{ xor } (! A[i+1] \text{ or } B[i+1])) \text{ and US\_CMP})$ $G[i] =$ $(((A[i] \text{ xor } !B[i]) \text{ and } (A[i+1] \text{ or } B[i+1])) \text{ and ADD})$ or $((A[i] \text{ xor } B[i]) \text{ and } (! A[i+1] \text{ or } B[i+1])) \text{ and SUB})$ or $((A[i] \text{ xor } B[i]) \text{ and } (! A[i+1] \text{ or } B[i+1])) \text{ and S\_CMP})$ or $((A[i] \text{ xor } B[i]) \text{ and } (! A[i+1] \text{ or } B[i+1])) \text{ and US\_CMP})$ $Z[i] =$ $((A[i] \text{ xor } B[i]) \text{ and } (! A[i+1] \text{ or } !B[i+1])) \text{ and ADD})$ or $((A[i] \text{ xor } !B[i]) \text{ and } (A[i+1] \text{ or } !B[i+1])) \text{ and SUB})$ or $((A[i] \text{ xor } !B[i]) \text{ and } (A[i+1] \text{ or } !B[i+1])) \text{ and S\_CMP})$ or $((A[i] \text{ xor } !B[i]) \text{ and } (A[i+1] \text{ or } !B[i+1])) \text{ and US\_CMP})$ Propagate, generate, and kill outputs, bit 63 (LSB):

$P[63] = (((A[63] \text{ xor } !B[63]) \text{ xor CA}) \text{ and ADD})$ or $(((A[63] \text{ xor } B[63]) \text{ xor CA}) \text{ and SUB})$ or $(((A[63] \text{ xor } B[63]) \text{ xor CA}) \text{ and S\_CMP})$ or $(((A[63] \text{ xor } B[63]) \text{ xor CA}) \text{ and US\_CMP})$ $G[63] = (((A[63] \text{ xor } !B[63]) \text{ and CA}) \text{ and ADD})$ or $(((A[63] \text{ xor } B[63]) \text{ and CA}) \text{ and SUB})$ or $(((A[63] \text{ xor } B[63]) \text{ and CA}) \text{ and S\_CMP})$ or $(((A[631] \text{ xor } B[63]) \text{ and CA}) \text{ and US\_CMP})$ $Z[63] = (((A[63] \text{ xor } B[63]) \text{ and } (! CA)) \text{ and ADD})$ or $(((A[63] \text{ xor } !B[63]) \text{ and } (! CA)) \text{ and SUB})$ or $(((A[63] \text{ xor } !B[63]) \text{ and } (! CA)) \text{ and S\_CMP})$ or $(((A[63] \text{ xor } !B[63]) \text{ and } (! CA)) \text{ and US\_CMP})$ The 64 sets of P, G, and Z signals produced by computation stage 60 are then passed to merging stage 62, which merges each group of four sets into a single set of P, G, and Z signals utilizing conventional merging circuitry, such as that commonly found in carry look-ahead adders (CLAs). Merging stages 64 and 66, which are constructed similarly to merging stage 62, merge the 16 sets of P, G, and Z signals output by merging stage 62 into a single set of P, G, and Z output signals. The P signal output by merging stage 66 yields the value of the EQ bit for compare, add, and subtract instructions. The G and Z signals, on the other hand, have differing meanings depending on the instruction type. In the illustrative embodiment in which processor 10 is a PowerPC™ processor, the G signal output by the merge tree provides the value of the LT bit for compare instructions and the GT bit for add and subtract instructions. Conversely, the Z signal provides the value of the GT bit for compare instructions and the LT bit for add and subtract instructions. For compare instructions, the LT bit provided by the G signal is set to 1 if A<B, and the GT bit provided by the Z signal is set to 1 if A>B. While the P, G, and Z signals described above will supply correct values for the condition code bits in a variety of processor architectures, the meaning of each signal can vary depending upon how a particular processor architecture implements compare and recording instructions. Once the P, G, and Z signals have been utilized to set the value of the appropriate condition code bits within one of CR rename buffers 46, the condition code bits may then be utilized to resolve conditional branch instructions.

Figure 3:
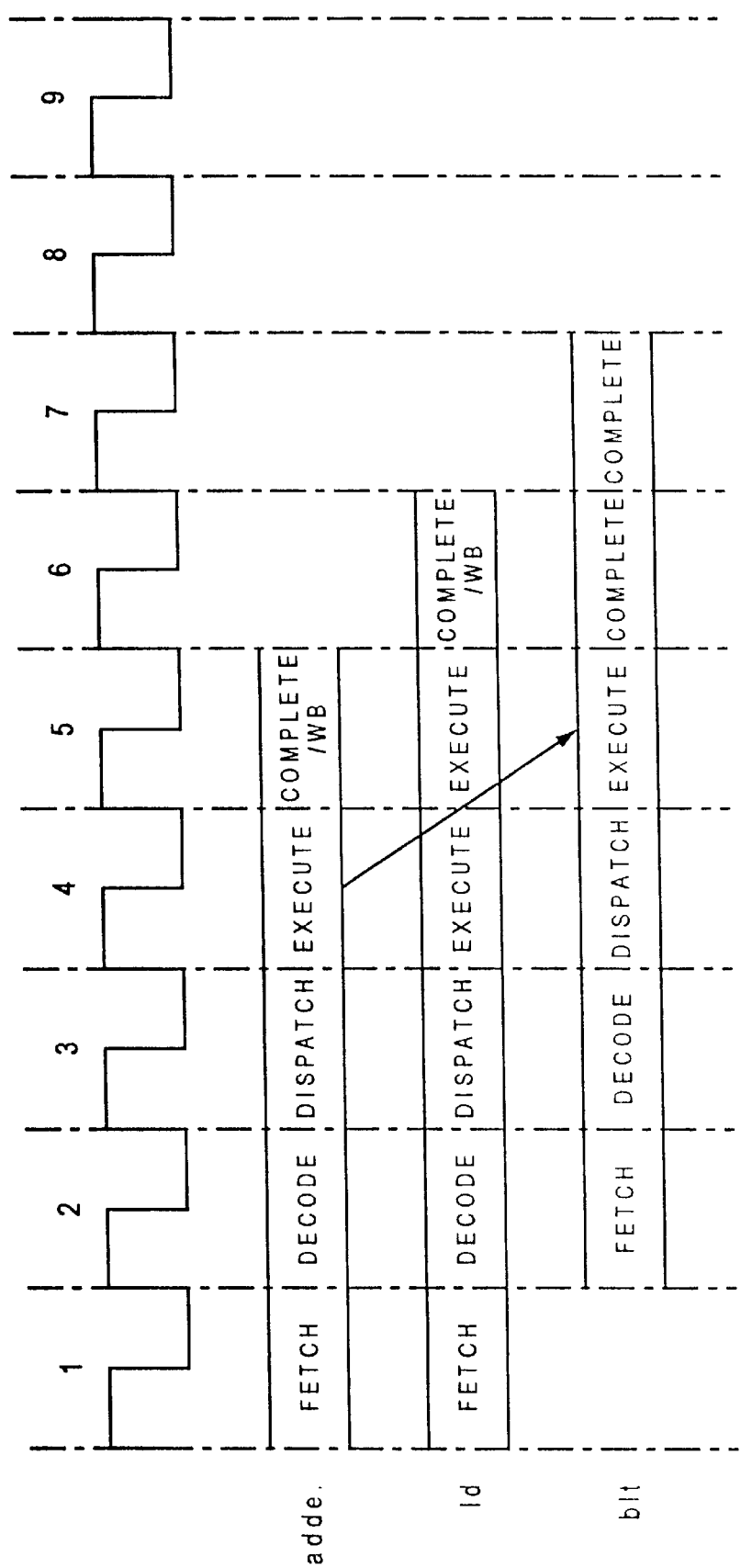
FIG. 3 is a timing diagram illustrating the computation of the LT, GT, and EQ condition register bits in parallel with the execution of an instruction.

With reference now to FIG. 3, a timing diagram is shown that illustrates the advantage of calculating the LT, GT, and EQ condition code bits in parallel with the execution of an instruction in accordance with the present invention. As depicted, a recording form of an add ("adde.") instruction and a load ("ld") instruction are fetched from instruction cache 14 during cycle 1, and a branch less than ("blt") instruction is fetched from instruction cache 14 during cycle 2. The branch less than instruction is a conditional branch instruction that depends upon the state of the LT bit generated by the add instruction.

The add instruction is decoded by dispatch unit 20 during cycle 2 and is dispatched to an FXU 22 during cycle 3. In response to dispatch of the add instruction, the ADD control signal among control signals 21 is asserted, and both the FXU 22 and CCU 24 receive the operands specified by the add instruction from one or more of GPRs 32, GPR rename buffers 33, and the architected register containing the CA bit. During cycle 4, FXU 22 performs the add operation, storing the result in one of GPR rename buffers 33. In parallel with the execution of the add instruction, CCU 24 computes the LT, GT, and EQ condition code bits, storing them in one of CR rename buffers 46. Although the branch less than instruction is executed by BPU 18 during the following cycle (i.e., cycle 5), the availability of the condition code bits in one of CR rename buffers 46 permits the branch instruction to be executed without speculation. In contrast, a conventional processor can determine the condition code bits during cycle 5 at the earliest, meaning that the branch instruction would be executed speculatively by prediction or simply delayed one cycle until the condition was resolved. Thus, the present invention advantageously reduces speculative execution of branch instructions, thereby reducing the attendant performance penalty incurred in the event of misprediction of a branch.

As has been described, the present invention provides an improved method and apparatus for computing LT, GT, and EQ condition code bits. In accordance with the present invention, a condition code unit directly executes signed and unsigned compare instructions and computes condition code bits associated with recording instructions in parallel with the execution of those instructions. The circuitry utilized to compute the condition code bits is compact and includes only a small number of logic levels in order to permit the condition code bits to be determined in a single cycle. Advantageously, for addition and subtraction instructions, the condition code unit can compute the condition code bits correctly in the presence of overflow and with or without a carry-in (CA) operand.

While the invention has been particularly shown and described with reference to a preferred embodiment, it will be understood by those skilled in the art that various changes in form and detail may be made therein without departing from the spirit and scope of the invention. For example, the present invention may be modified to include additional types of recording instructions other than add and subtract instructions disclosed above.

What is claimed is:

1. A processor, comprising:

an execution unit that executes an instruction by performing an operation indicated by said instruction utilizing at least a first operand and a second operand that each include one or more and at most M bit positions, each of said one or more bit positions having a bit value; and condition code logic that determines less than, greater than, and equal to condition code bits associated with said instruction concurrently with performance of said operation by said execution unit, wherein said condition code logic includes a single computation stage containing M combination elements that each receive as inputs individual bit values of a respective bit position within said first and said second operands, wherein each of said M combination elements of said single computation stage logically combines said individual bit values and outputs each of propagate, generate and kill signals for its respective one of said M bit positions, wherein propagate, generate and kill signals for all of said M bit positions collectively indicate values for said less than, greater than, and equal to condition code bits.

2. The processor of claim 1, wherein said one or more operands include a first operand and a second operand, said instruction comprising a compare instruction that compares a magnitude of said first operand and a magnitude of said second operand.

3. The processor of claim 2, wherein said compare instruction is a signed compare instruction.

4. The processor of claim 1, wherein said one or more operands include a first operand and a second operand, said instruction comprising an arithmetic instruction that arithmetically combines said first operand and said second operand.

5. The processor of claim 4, said first operand and said second operand having magnitudes such that, when arithmetically combined by execution of said arithmetic instruction, an overflow occurs.

6. The processor of claim 1, said condition code logic further comprising:

at least one merging stage coupled to said computation stage, wherein said at least one merging stage receives as inputs said one or more logic signals and merges said one or more logic signals into at most a greater than signal, a less than signal, and an equal to signal.

7. The processor of claim 1, each of said M combination elements producing said propagate, generate, and kill signals utilizing bit values of at most two bit positions.

8. The processor of claim 1, wherein at least one of said M combination elements computes said propagate, generate, and kill signals in response to a type of said instruction.

9. A method for computing condition code bits in a processor, said method comprising:

executing an instruction by performing an operation indicated by said instruction utilizing at least a first operand and a second operand that each include one or more and at most M bit positions, each of said one or more bit positions having a bit value; and concurrent with performing said operation, computing less than, greater than, and equal to condition code bits associated with said instruction, wherein computing less than, greater than, and equal to bits includes:

receiving as inputs individual bit values of bit positions within said first and said second operands;

logically combining said individual bit values to produce each of a propagate, generate, and kill signal for each respective one of said M bit positions; and outputting one or more logic signals that collectively indicate values for said less than, greater than, and equal to condition code bits.

10. The method of claim 9, wherein said one or more operands include a first operand and a second operand, execution of said instruction comprising executing a compare instruction that compares a magnitude of said first operand and a magnitude of said second operand.

11. The method of claim 10, wherein executing a compare instruction comprises executing a signed compare instruction.

12. The method of claim 9, wherein said one or more operands include a first operand and a second operand, wherein executing an instruction comprises executing an arithmetic instruction that arithmetically combines said first operand and said second operand.

13. The method of claim 12, said first operand and said second operand having magnitudes such that, when arithmetically combined by execution of said arithmetic instruction, an overflow occurs.

14. The method of claim 9, and further comprising:

merging said one or more logic signals into at most a greater than signal, a less than signal, and an equal to signal.

15. The method of claim 9, wherein producing each of a propagate, generate, and kill signal comprises producing said propagate, generate, and kill signals utilizing bit values of at most two bit positions.

16. The method of claim 9, wherein producing each of a propagate, generate, and kill signal comprises producing, for at least one of said M bit positions, propagate, generate, and kill signals in response to a type of said instruction.

* * * * *